Nov. 17, 1959  W. MAAG  2,913,627
PROGRAM TIMING CONTROL CIRCUIT
Filed Sept. 15, 1958  3 Sheets-Sheet 3

Inventor:
Walter Maag
By: Michael S. Striker
Attorney

United States Patent Office 2,913,627
Patented Nov. 17, 1959

2,913,627

PROGRAM TIMING CONTROL CIRCUIT

Walter Maag, Geroldswill, Switzerland, assignor to H. A. Schlatter Aktiengesellschaft, Zollikon, Zurich, Switzerland Application September 15, 1958, Serial No. 761,182

Claims priority, application Switzerland September 14, 1957

5 Claims. (Cl. 315—84.5)

The present invention relates to program control circuits. More particularly, the present invention relates to program timing control circuits wherein timing sequences are to be related to a selectable number of impulses in an impulse series.

The electronic control of programming circuits by means of timing circuits and switches by using a series of impulses are known. The present invention can be used with a series of impulses which are rectangular in shape such as derived from a multivibrator or it can use the alternating current impulses available from the ordinary house current supply. The circuit of the present invention provides timing control wherein a plurality of individual program portions can be selected even though each of the program portions is different from the preceding one. Such circuits can be used for example to control resistance welding machines wherein the duration and magnitude of the voltage applied to the resistance welding machine must be critically and accurately controlled so that the resistance weld obtained from the machine is exactly in accordance with the required specification.

With conventional control circuits it was only possible to set the time and voltage magnitude controls so that the resistance welding machine would carry out a single operation. It was not possible until the time of the present invention to provide resistance welding machines which are capable of carrying out automatically a sequence of operations, each of which operations can have both different time and voltage controls.

It is accordingly an object of the present invention to provide a new and improved program timing control circuit.

A second object of the present invention is to provide a new and improved program timing control circuit where a number of different timing sequences can be independently selected to follow one another.

A further object of the present invention is to provide a new and improved program timing control circuit wherein the apparatus can have a control provided therein for repeating an entire series of timing sequences, whenever desired.

A further object of the present invention is to provide a new and improved program timing control circuit wherein two separate impulse counting chains are used with a plurality of switching members connected therebetween. The position of the switching members may be independently varied to determine both the initiation and termination of the counting circuits.

With the above objects in view, the present invention mainly consists of a program timing control circuit wherein timing sequences are to be related to a selectable number of impulses in an impulse series and including a plurality of first gas discharge members having input and output circuits respectively, the input circuits being respectively connected in parallel to receive the impulses in the impulse series, the first gas discharge members forming a first impulse counting chain wherein the output of each of the gas discharge members is respectively connected to the input of one of the other of the first gas discharge members; a plurality of second gas discharge members having input and output circuits respectively and forming an auxiliary impulse counting chain wherein the output of each of the second gas discharge members is respectively connected to the input of one of the other of the second gas discharge members; amplifying means having an input connected to each of the outputs of the second gas discharge members and having an output connected to the input of the first of said first gas discharge members of the first impulse counting chain; plurality of switching means, each of the switching means being movable into and out of a plurality of different circuit-closing positions and being connected respectively to the input of one of the second gas discharge members and each of the outputs of the first gas discharge members in each of its circuit-closing positions, respectively; means for supplying operating potentials to each of the gas discharge members and the amplifier; and actuating means connected to the first gas discharge member of the auxiliary impulse counting chain for discharging the last-mentioned discharge member to initiate the counting chain action whereby the output of the last-mentioned discharge member is amplified by said amplifier and applied to the first gas discharge member of the first impulse counting chain to ignite sequentially the remaining members of the first impulse chain in accordance with the occurrence of the impulses in the impulse series, the counting action thus initiated being terminated by the successive discharges of the second gas discharge members as determined by the circuit closing positions of the switching means.

In a preferred embodiment of the present invention, the input circuit of each of the gas discharge members includes a control electrode of the member and the output circuit includes the cathode. In addition, the output circuits may have a parallel combination of cathode resistor and capacitor, which parallel combination is connected to the control electrode of the next gas discharge member in the impulse counting chain.

In a further embodiment of the present invention, the first gas discharge member of the first impulse counting chain has three gas discharge tubes, one of the gas discharge tubes having two control electrodes, each of which control electrodes is respectively connected to the output of one of the other gas discharge tubes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
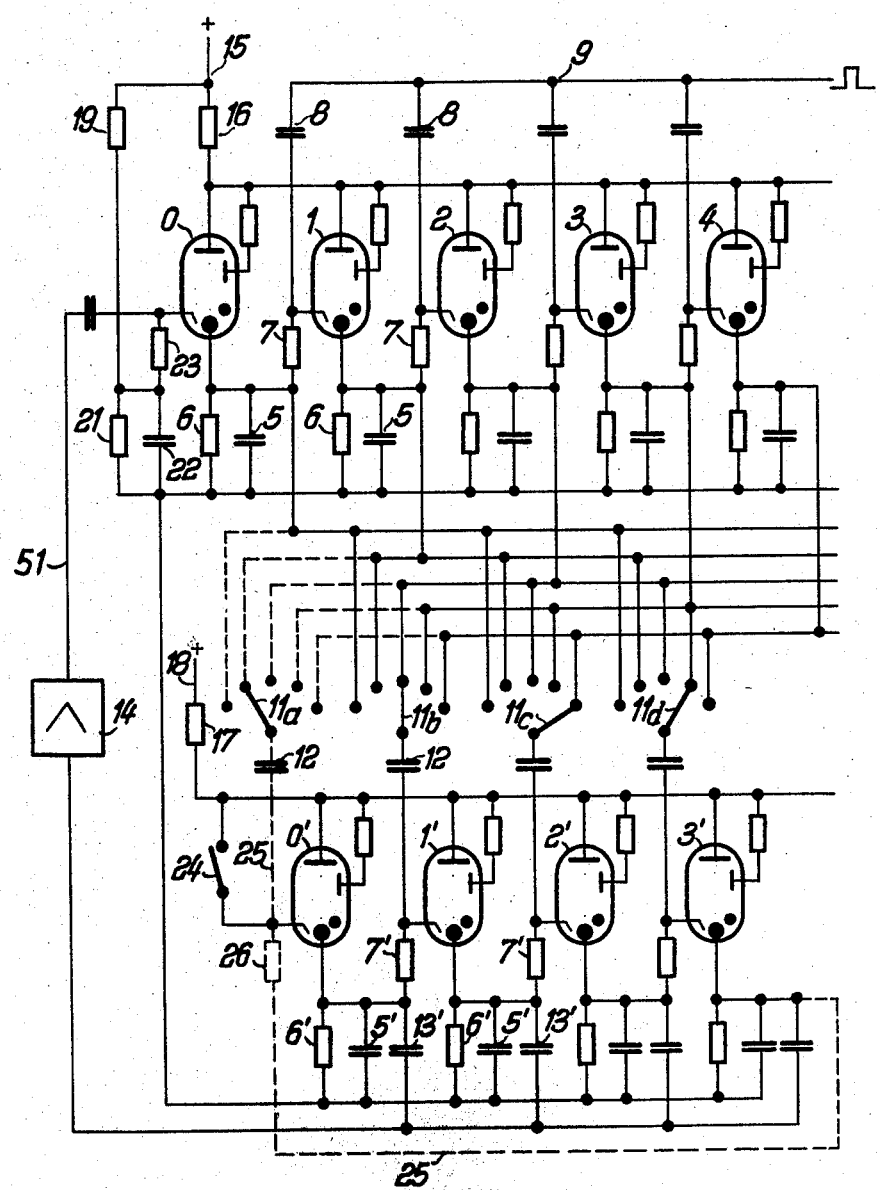
Figure 1 is an electrical schematic diagram showing one embodiment of the present invention.

Referring to the drawings and more particularly to Figure 1, it can be seen that the circuit includes a first impulse counting chain made up of a series of gas discharge members 0, 1, 2, 3 and 4. In addition, an auxiliary counting chain is provided namely 0', 1', 2' and 3'.

Each of the gas discharge members in the first impulse counting chain has in the output circuit thereof a cathode resistor 6 connected in parallel with a cathode capacitor 5. Similarly, each of the gas discharge members in the auxiliary counting chain has a cathode resistor 6' connected in parallel respectively with a capacitor 5'.

Furthermore, it can be seen that in the first impulse counting chain the parallel combination of the cathode resistor 6 and capacitor 5 is connected to the control electrode of the next succeding gas discharge member by means of a resistor 7. In the auxiliary impulse counting chain, the parallel cathode resistor 6' and the capacitor 5' are respectively connected to the control electrode of the next succeeding gas discharge member by means of a resistor 7'.

In addition, the control electrode of each of the members 1, 2, 3, and 4 are respectively connected by means of a respective capacitor 8 to an input conductor 9. The rectangular impulse shown adjacent the input conductor 9 indicates that the available impulse series is applied to the input conductor 9.

In addition, there are three switching means $11_b$, $11_c$ and $11_d$ connected between the first impulse counting chain and the auxiliary impulse counting chain. It can be seen that the switch $11_b$ is provided with a movable switch arm member which has one end thereof connected to a capacitor 12 the other plate of the capacitor being connected to the control electrode of the gas discharge member 1'. The movable arm of the switch $11_b$ can be moved through any one of a plurality of five positions.

In the illustrated embodiment, the arm position which is farthest counterclockwise is considered the zero or null position while the position numbers increase clockwise to the maximum number. Similarly, the switches $11_c$ and $11_d$ are respectively connected through their capacitors to the control electrodes of the gas discharge members 2' and 3'. It is clear that the fixed contacts of the switches are respectively connected to the cathodes of each of the gas discharge members of the first impulse counting chain. For example the contacts corresponding to null or zero of the switches $11_b$, $11_c$ and $11_d$ are connected to the cathode of the gas discharge member 0. Similarly the contacts corresponding to the number 1 are all connected to the cathode of the gas discharge member 1 and so on until the contacts corresponding to the number 4 are seen connected to the cathode of the gas discharge member 4.

The cathodes of the gas discharge members 0', 1', 2' and 3' of the auxiliary impulse counting chain are connected respectively by means of capacitor 13' to the input of an ampflier 14. The output of the amplifier 14 is connected by means of a conductor 51 to the control electrode of the gas discharge member zero. Operating potentials for the tubes in the first impulse counting chain are provided by the potential conductor 15 through the anode resistor 16. Similarly operating potentials for the auxiliary impulse counting chain are provided by the potential conductor 18 through the anode resistor 17.

The first tube 0 of the first impulse counting chain is provided with a voltage divider made up of the resistors 19 and 21. The resistor 21 is connected in parallel and bridged by a capacitor 22 so that the voltage divider arrangement provides a bias voltage for the gas discharge member 0 by means of a further resistor 23.

Between the anode resistor 17 and the control or igniting electrode of the first tube 0' of the auxiliary impulse counting chain is a switch 24. The dotted conductor 25 and the resistor 26 shown in dotted lines are connected via a condenser 12 to a switch $11_a$ which may be used if desired for providing a complete repetition of the entire program as will be explained hereinbelow.

By means of these connections, it can be seen that the auxiliary impulse counting chain is in the form of a so-called ring circuit. It is essential that the operating potential and the magnitude of the various components of the auxiliary impulse counting chain are so chosen that it is not possible to discharge any of the gas discharge members 0', 1', 2' and 3' unless the preceding gas discharge member has already been ignited, as will be explained further below.

As an illustrative example of the operation of the present invention, in Fig. 1 the switch $11_b$ is shown connected for a timing sequence based on the second impulse, the switch $11_c$ for a period of four impulses and the switch $11_d$ for a period of three of the impulses of the impulse series.

In operation, the switch 24 is closed to connect the potential from the conductor 18 to the igniting or control electrode of the gas discharge member 0'. The discharge of this member 0' produces a voltage drop across the cathode resistor 6' thereof and also charges the capacitor 5'.

The voltage drop produced across the cathode resistor 6' of the gas discharge member 0' is applied to the amplifier 14 through the capacitor 13' and from there on the conductor 51 to the first gas discharge member 0 of the first impulse counting chain. As has previously been indicated, the tube 0 has been provided with a bias potential which is chosen to be sufficiently high to cause the tube 0 to discharge upon the application of the amplified output from the amplifier 14. The discharge of the tube 0 produces across its respective cathode resistor 6 a voltage drop which in turn provides a bias potential for the gas discharge member 1. This bias potential is sufficiently high to cause the member 1 to be ignited and to be discharged by the occurrence of the next impulse in the impulse series applied to the input conductor 9. It is therefore apparent that the ignition or discharge of the tube 0 starts the counting action for the first impulse counting chain.

The next impulse to arrive on the conductor 9 causes the member 1 to be discharged and produces thereacross at the cathode thereof a bias potential which is applied to the control electrode of the gas discharge member 2. It is apparent that although all of the tubes 1, 2, 3 and 4 are connected in parallel, none of them will be ignited until the proper bias potential is applied to the control electrode thereof.

Accordingly when the next impulse arrives, since the member 2 has the proper bias potential due to the previous discharge of the member 1, the member 2 will be ignited or discharged. This applies the voltage produced across its respective cathode resistor to the control electrode of the tube 3 but it also applies the voltage thereacross to the arm of the switch $11_b$. It should be noted that in the illustrative example, this arm is connected to the position 2 and accordingly when the member 2 discharges the output voltage produced across its cathode resistor is applied through the switch $11_b$ to the control electrode of the member 1' by means of the capacitor 12.

The member 1' already has the proper bias potential applied to its control or igniting electrode since the member 0' has already been discharged. This will cause the member 1' to be discharged and produce across its cathode resistor 6' an output voltage which is applied through its respective capacitor 13' to the amplifier 14. Incidentally, upon the discharge of the member 1 the member 0' no longer remains discharged. The additional discharge through the member 1' causes the voltage across the anode resistor 17 to drop to such an extent that it will no longer support the discharge in the member 0'. It will however support the discharge in the member 1' since the capacitor 5' in the cathode circuit of the member 1' has just been fully charged. The capacitor 13' in the cathode circuit of the member 0' has been discharging through its respective parallel capacitor 6' so that the effective anode voltage applied to the member 0' falls below the extinguishing value.

The amplified output from the amplifier 14 which is due to the voltage coming from the discharge member 1' is applied on the conductor 51 to again ignite the member 0 and for the second time start the action of the first impulse counting chain. The next of the impulses to arrive on the input conductor 9 ignites the member 1, the second impulse ignites the member 2, the third impulse ignites the member 3 while the fourth impulse ignites the member 4. As has already been pointed out here and above only one of the members in the first impulse counting chain can be ignited at any one time and which one is ignited depends on which of the preceding members has already been ignited.

In the illustrative example, the output from the member 4 is taken from the cathode thereof and applied through the switch $11_c$ which has been set to the position 4. From the switch $11_c$ this voltage is applied to the igniting or control electrode of the member 2', thereby igniting the member 2'. As has previously been noted the member 1' has previously been ignited to provide the proper bias potential for the member 2'. The discharge of the member 2' extinguishes the member 1' and provides a new output voltage from its cathode circuit which output voltage is applied to the amplifier 14. This output voltage is amplified and again applied to the member 0 in the first impulse counting chain to again initiate the impulse counting action which has been terminated by the ignition of the member 4 previously. The third initiation of the impulse counting chain results in the members 1, 2 and 3 of the first impulse counting chain being ignited coresponding to the sequentially arriving first second and third impulse of the impulse series applied to the incoming input conductor 9. The output from the member 3 is applied through the switch $11_d$ and ignites the member 3'.

In the embodiment utilizing the dotted conductor 25, the output voltage from the cathode of the member 3' will be applied to the igniting electrode of the member 0' to provide a bias potential for this member. Therefore the amplified output from the amplifier 14 due to the input coming from the ignited member 3' would again start the counting chain by igniting the member 0. However after the first impulse has arrived and the member 1 has discharged, the output voltage of the member 1 would be applied through the connected switch member $11_a$ to ignite the member 0'. This would have the same effect as the closing of the switch 24 so that the entire cycle as above described would now be repeated. The switch $11_a$ will also thereby provide a fourth program sequence.

It is clear from the above that the gas discharge members of the auxiliary impulse counting circuit can only be ignited when the tube immediately preceding the same has previously been ignited to provide the proper bias potential. It is therefore not essential that the switches $11_a$, $11_b$ and $11_c$ and $11_d$ be placed in any particular order. $11_b$ may control a larger number of impulses than switch $11_d$ since it is not possible for the member 3' to become ignited until the members 1' and 2' have been ignited previously.

If desired, instead of using a series of rectangularly shaped impulses, commonly produced by a multivibrator, it is possible to use the ordinary house current supply wherein each of the impulses would correspond to one period of the alternating current supply.

The above-described circuit has been utilized for resistance welding machines and it has been found that the output voltage for controlling the resistance welding machines can best be taken from one of the cathode resistors in the auxiliary impulse counting chain, such as the cathode resistor 6'. A potentiometer may be used to properly adjust the magnitude, if desired. It is apparent that the exact timing and duration of the applied voltage to the resistance welding machine is completely and accurately controlled by the above described program timing control circuit.

One of the difficulties that has been encountered in the use of this apparatus is the operation thereof when any of the switches $11_a$–$11_d$ is placed in the null position. It has been found that when the desired program timing sequence is zero impulses of the timing sequence, the member 0 in the impulse counting chain is ignited and the output thereof immediately used to ignite one of the members in the auxiliary impulse counting chain, depending on which of the switches has been set at null. This ignition or discharge of the member in the auxiliary impulse counting chain produces an immediate output voltage appearing at the cathode thereof. This output voltage is applied through the amplifier 14 back to the igniting electrode of the member 0. In such a situation, it is possible that the cathode capacitor 5 of the member 0 has not quite fully discharged through its respective cathode resistor 6. If such is the case it is possible that the member 0 will not be ignited and the next impulse counting sequence will not be initiated.

Figure 2:
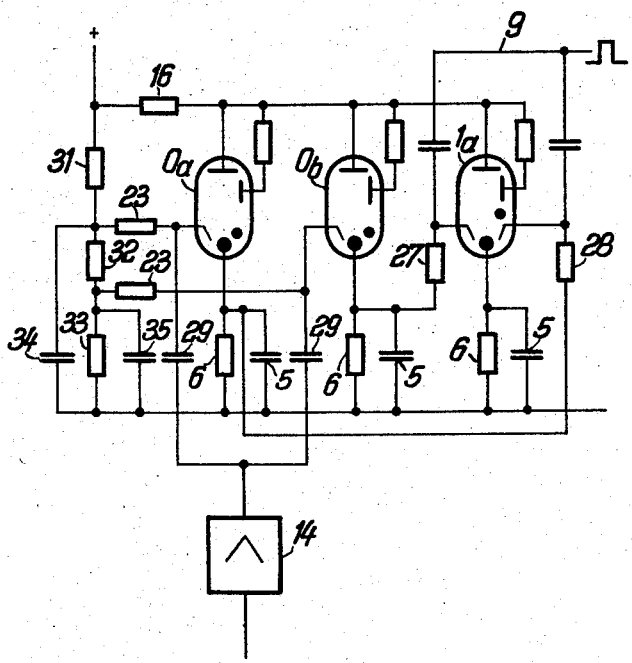
Figure 2 is a partial schematic diagram of a modification of the arrangement shown in Figure 1.

Referring now to Figure 2 a modification of the above-described circuit will be described to overcome this difficulty which does not always occur but might be a troublesome factor depending on the magnitudes of the various components chosen in the circuit.

In Figure 2 two gas discharge tubes $0_a$ and $0_b$ are provided in place of the single gas discharge member 0 of Figure 1. A voltage divider arrangement for the tube $0_a$ is provided by the resistors 31, 32 and 33. The connection of the resistor 23 between the voltage divider and the igniting electrode of the tube $0_a$ provides bias potential for this tube. Similarly a lower bias potential is provided for the tube $0_b$ by means of the resistor 23' connected between the voltage divider and the igniting electrode of the tube $0_b$.

It could also be seen that the output of the amplifier 14 is applied through capacitors 29 to the igniting electrodes of the tubes $0_b$ and $0_a$. The output of the tube $0_a$ is taken from the cathode thereof and applied through a resistor 28 to one of the igniting electrodes of the tube $1_a$. It can be seen that the tube $1_a$, unlike the tube of Figure 1, has two igniting electrodes, the other igniting electrode being connected through the resistor 27 to the cathode of the tube $0_b$.

In the voltage divider, the resistors 32 and 33 are connected in parallel with stabilizing capacitors 34 and 35. The resistors 31, 32 and 33 are chosen to have values such that the tube $0_a$ will ignite first upon the application of an output from the amplifier 14. However the smaller bias potential applied to the tube $0_b$ will be sufficient to ignite that tube if a second igniting voltage is applied as output from the amplifier 14 within a time period less than one period of the impulse voltages appearing on the conductor 9.

It is clear that as soon as the tube $0_a$ is ignited, the bias potential provided for the gas discharge member $1_a$ will be sufficient to ignite that member upon receiving the next impulse on the input conductor 9 whereupon the tube $0_a$ will be extinguished. If the output from the amplifier 14 appears a very short time thereafter it is not possible to again ignite the tube $0_a$ since its cathode capacitor 5 has not yet sufficiently discharged through the cathode resistor 6 thereof to provide a sufficiently high anode potential for igniting the tube $0_a$. In this case, the tube $0_b$ will be ignited to initiate once again the impulse counting chain so that the next arriving pulse on the conductor 9 will ignite the tube $1_a$. It is clear that the further operation of the impulse counting chain is then independent of either tubes $0_a$ or $0_b$ since once the member $1_a$ has been ignited the impulse counting chain then operates in the above-described manner as explained with respect to Figure 1.

Under normal conditions even with the circuit of Figure 2, if the output from the amplifier 14 arrives after the capacitor 5 has completely discharged through its corresponding cathode resistor 6 in the cathode circuit of the tube $0_a$, it is of course apparent that this voltage from the amplifier will now again ignite the tube $0_a$ and the operation will proceed as explained hereinabove.

Figure 3:
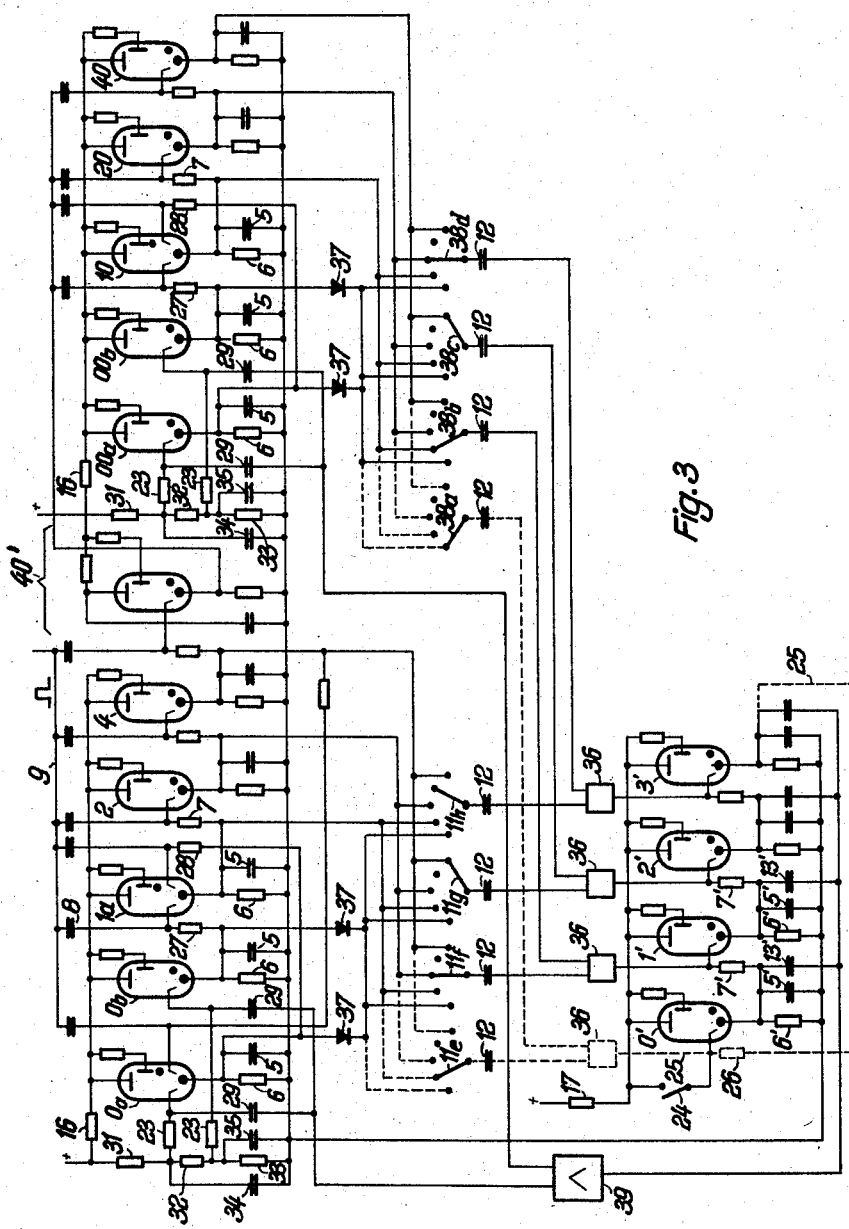
Figure 3 is an electrical schematic diagram of a further embodiment of the present invention capable of providing additional timing sequences if desired.

Referring now to Figure 3, an arrangement is shown wherein an additional number of programming circuits can be provided. In Figure 3 the first gas discharge member 0 of Figure 1 has been replaced by the two gas discharge tubes $0_a$ and $0_b$ of Figure 2. Furthermore the impulse counting chain is divided into two parts, the first part consisting of the gas discharge members $0_a$, $0_b$, $1_a$, 2 and 4. The second part consists of the gas discharge members $00_a$, $00_b$, 10, 20 and 40. In this embodiment, the gas discharge members 3 and 30 have been left out of the drawings in order to save space and avoid unnecessarily complicating the drawings. However it is apparent that these gas discharge members operate in the manner as set forth in Figure 1.

With the arrangement shown in Figure 3, it is possible to provide a program wherein the number of timing sequences can run into two orders. As compared with Figure 1 there are double the number of switches $11_e$, $11_f$, $11_g$ and $11_h$; $38_a$, $38_b$, $38_c$, and $38_d$. It is to be noted that the output of the switches $11_e$ and $38_a$ are connected together to the input of a coincidence circuit 36. Similarly the switches $11_f$ and $38_b$; $11_g$ and $38_c$; and $11_h$ and $38_d$ are also connected respectively to separate coincidence circuits 36.

Furthermore, connected between the gas discharge member $0_a$, $0_b$ and their respective switches and between members $00_a$ and $00_b$ and their respective switches are rectifiers 37 which prevent these initiating tubes of the impulse counting chains from being activated through the operation of the adjacent impulse counting chain.

It can be seen that each of the gas discharge members 0'–3' is connected respectively to the output of one of the coincidence circuits 36. This corresponds to the two orders of the impulses in the impulse series to be counted. Each of the inputs to the coincidence circuit 36 is connected by means of a capacitor 12.

Since at the end of one of the timing sequences as determined by the output from the amplifier 39 it is necessary to extinguish all of the gas discharge members in the impulse counting chains, the amplifier 39 is provided with two outputs, each one of the outputs being connected respectively to the input of the first ones of the gas discharge means in each of the impulse counting chains. Between the two different counting chains is provided a short impulse generator 40' which operates in the nature of a tens transfer circuit so that when the highest number of the first counting chain is reached, a short impulse is provided to initiate action in the second impulse counting chain.

In operation, the circuit of Figure 3 is comparable to the arrangement already described for Figures 1 and 2. However in this arrangement, in order to ignite or initiate discharge in the gas discharge members of the auxiliary impulse counting chain, it is necessary for both of the outputs from each of the chains (members $0_a$–4 and $00_a$–40) to arrive at the respective coincidence circuit 36 at the same time. When this is achieved the respective gas discharge member is ignited.

If the connections shown by the dotted lines are provided, the entire program will be repeated automatically when the gas discharge member 0' is again ignited through its respective coincidence circuit 36. If any of the switches $11_e$–$11_h$ is set to its first or null position then the position of the switches $38_a$–$38_d$ will be controlling. In this arrangement it is clear that the impulse numbers 0, 10, 20 or 40 will be provided by these last named switches.

It should be noted that in the impulse chains shown in Figure 3, the tubes $1_a$ and 10 are each provided with two control or igniting electrodes so that the advantages of the improved modification discussed with respect to Figure 2 can be achieved. It is also clear that for the purposes of controlling the operation of the resistance welding machine, it is possible to connect potentiometers respectively in parallel with each of the cathode resistors 6' in the auxiliary impulse counting circuit. It is further clear that the number of impulse counting chains and auxiliary counting chains can be unlimited for any practical operation. With the above-described apparatus it is accordingly apparent that a large number of different timing sequences can be related to any selected number of the impulses of the square wave output of a multivibrator or of the alternating current output provided by the house current.

It will be understood that each of the elements described above, or two or more together, may also find a useful application in other types of program timing control circuits differing from the types described above.

While the invention has been illustrated and described as embodied in control circuits for a resistance welding machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a program timing control circuit wherein timing sequences are to be related to a selectable number of impulses in an impulse series, in combination, a plurality of first gas discharge members having input and output circuits respectively, said input circuits being respectively connected in parallel to receive the impulses in the impulse series, said first gas discharge members forming a first impulse counting chain wherein the output of each of said gas discharge members is respectively connected to the input of one of the others of said gas discharge members; a plurality of second gas discharge members having input and output circuits respectively and forming an auxiliary impulse counting chain wherein the output of each of said second gas discharge members is respectively connected to the input of one of the others of said second gas discharge members; amplifying means having an input connected to each of the outputs of said second gas discharge members and having an output connected to the input of the first of said first gas discharge members of said first impulse counting chain; a plurality of switching means, each of said switching means being movable into and out of a plurality of different circuit-closing positions and being connected respectively between the input of one of said second gas discharge members and each of the outputs of said first gas discharge members in each of its circuit-closing positions, respectively; means for supplying operating potentials to each of said gas discharge members and to said amplifier; and actuating means connected to the first gas discharge member of said auxiliary impulse counting chain for discharging said last-mentioned discharge member to initiate the counting chain action whereby the output of said last-mentioned discharge member is amplified by said amplifier and applied to said first gas discharge member of said first impulse counting chain to ignite sequentially the remaining members of said first impulse chain in accordance with the occurrence of the impulses in the impulse series, the counting action thus initiated being terminated by the successive discharges of said second gas discharge members as determined by the circuit-closing positions of said switching means.

2. In a program timing control circuit wherein timing sequences are to be related to a selectable number of impulses in an impulse series, in combination, a plurality of first gas discharge members having input and output circuits respectively, each of said input circuits including a control electrode and each of said output circuits including respectively a cathode, said control electrodes of each of said first gas discharge members being respectively connected in parallel to receive the impulses in the impulse series, said first gas discharge members forming a first impulse counting chain wherein the cathode of each of said gas discharge members is respectively connected to the control electrode of the next one of said gas discharge members in said first impulse counting chain; a plurality of second gas discharge members having input and output circuits respectively, each of said input circuits of said second gas discharge members including a control electrode and each of said output circuits of said second gas discharge members including a cathode, said plurality of second gas discharge members forming an auxiliary impulse counting chain wherein the cathode of each of said second gas discharge members is respectively connected to the control electrode of the next of said second gas discharge members in said auxiliary impulse counting chain; amplifying means having an input connected to each of the cathodes of said second gas discharge members and having an output connected to the control electrode of the first of said first gas discharge members of said first impulse counting chain; a plurality of switching means, each of said switching means being movable into and out of a plurality of different circuit-closing positions and being connected respectively between the input of one of said second gas discharge members and each of the outputs of said first gas discharge members in each of its circuit-closing positions, respectively; means for supplying operating potentials to each of said gas discharge members and to said amplifier; and actuating means connected to the first gas discharge member of said auxiliary impulse counting chain for discharging said last-mentioned discharge member to initiate the counting chain action whereby the output of said last-mentioned discharge member is amplified by said amplifier and applied to said first gas discharge member of said first impulse counting chain to ignite sequentially the remaining members of said first impulse chain in accordance with the occurrence of the impulses in the impulse series, the counting action thus initiated being terminated by the successive discharges of said second gas discharge members as determined by the circuit-closing positions of said switching means.

3. In a program timing control circuit wherein timing sequences are to be related to a selectable number of impulses in an impulse series, in combination, a plurality of first gas discharge members having input and output circuits respectively, said output circuit of each of said first gas discharge members including a cathode resistor connected in parallel with an output cathode capacitor, said input circuits being respectively connected in parallel to receive the impulses in the impulse series, said first gas discharge members forming a first impulse counting chain wherein the output of each of said gas discharge members including said parallel connected resistor and capacitor is respectively connected to the input of one or the other of said gas discharge members in the first impulse counting chains; a plurality of second gas discharge members having input and output circuits respectively, said output circuits of said second gas discharge members including a cathode resistor being connected in parallel respectively with a capacitor, said plurality of second gas discharge members forming an auxiliary impulse counting chain wherein the output including said parallel connected cathode resistor and capacitor is respectively connected to the input of one or the other of said second gas discharge members in said auxiliary impulse counting chain; amplifying means having an input connected to each of the parallel connected cathode resistors and capacitors of said second gas discharge members and having an output connected to the input of the first of said first gas discharge members of said first impulse counting chain; a plurality of switching means, each of said switching means being movable into and out of a plurality of different circuit-closing positions and being connected respectively between the input of one of said second gas discharge members and each of the outputs of said first gas discharge members in each of its circuit-closing positions, respectively; means for supplying operating potentials to each of said gas discharge members and to said amplifier; and actuating means connected to the first gas discharge member of said auxiliary impulse counting chain for discharging said last-mentioned discharge member to initiate the counting chain action whereby the output of said last-mentioned discharge member is amplified by said amplifier and applied to said first gas discharge member of said first impulse counting chain to ignite sequentially the remaining members of said first impulse chain in accordance with the occurrence of the impulses in the impulse series, the counting action thus initiated being terminated by the successive discharges of said second gas discharge members as determined by the circuit-closing positions of said switching means.

4. Apparatus as claimed in claim 3 wherein the first gas discharge member of said first impulse counting chain includes three gas discharge tubes, the first two of said gas discharge tubes being connected in parallel and having respectively an anode, a cathode and a control electrode, the third one of said three gas discharge tubes having an anode, a cathode and a pair of control electrodes, one of said pair of control electrodes being connected to the output of one of said first two gas discharge tubes and the other of said pair of control electrodes being connected to the output of the other of said first two gas discharge tubes.

5. Apparatus as claimed in claim 4 wherein one of said gas first two discharge tubes is biased so as to be ignited before the other of said first two gas discharge tubes.

References Cited in the file of this patent

UNITED STATES PATENTS

| 2,774,534 | Dunn | Dec. 18, 1956 |
| 2,816,249 | Brightman | Dec. 10, 1957 |
| 2,851,534 | Bray et al. | Sept. 9, 1958 |

FOREIGN PATENTS

| 735,508 | Great Britain | Aug. 24, 1955 |